(12) United States Patent
Nandam et al.

(10) Patent No.: US 11,063,471 B2
(45) Date of Patent: *Jul. 13, 2021

(54) BATTERY MODULES HAVING DETECTION CONNECTORS AND RELATED SYSTEMS

(71) Applicant: Eaton Intelligent Power Limited, Dublin (IE)

(72) Inventors: Pradeep Kumar Nandam, Cary, NC (US); David Glenn Miller, Clayton, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,504

(22) Filed: Jul. 13, 2020

(65) Prior Publication Data

US 2021/0036545 A1 Feb. 4, 2021

Related U.S. Application Data

(63) Continuation of application No. 16/213,211, filed on Dec. 7, 2018, now Pat. No. 10,714,971, which is a
(Continued)

(51) Int. Cl.
*H02J 9/00* (2006.01)
*H02J 9/06* (2006.01)
(Continued)

(52) U.S. Cl.
CPC ............. *H02J 9/061* (2013.01); *H01M 10/48* (2013.01); *H01M 10/482* (2013.01);
(Continued)

(58) Field of Classification Search
CPC ........................................................ H02J 9/061
See application file for complete search history.

(56) References Cited

U.S. PATENT DOCUMENTS

| 5,355,073 A | 10/1994 | Nguyen | H02J 7/0006 |
| | | | 320/116 |
| 6,274,950 B1 | 8/2001 | Gottlieb | G01R 31/3648 |
| | | | 307/66 |

(Continued)

FOREIGN PATENT DOCUMENTS

| CN | 1031454 | 3/1989 |
| EP | 2 693 514 A1 | 2/2014 |
| WO | WO 2007/149759 A2 | 12/2007 |

OTHER PUBLICATIONS

International Search Report and the Written Opinion of the International Searching Authority corresponding to International Patent Application No. PCT/US2016/013990 (12 pages) (dated May 13, 2016).

(Continued)

*Primary Examiner* — Hai L Nguyen
(74) *Attorney, Agent, or Firm* — Stanek Lemon Crouse & Meeks, PA (57) ABSTRACT

A battery module is provided including a battery module connector configured to engage with a backplane connector on a backplane board associated with an uninterruptible power supply (UPS). When the battery module connector is engaged with the backplane connector a circuit is completed that instantaneously indicates to the UPS that the battery module is connected. When the battery module connector is disengaged from the backplane connector the circuit is opened and instantaneously indicates to the UPS that the battery module is disconnected.

20 Claims, 6 Drawing Sheets

Related U.S. Application Data continuation of application No. 14/601,364, filed on Jan. 21, 2015, now Pat. No. 10,153,658.

(51) Int. Cl.
| | |
|---|---|
| *H02J 7/00* | (2006.01) |
| *H01M 10/48* | (2006.01) |
| *H01M 50/20* | (2021.01) |
| *H01M 50/502* | (2021.01) |
| *H02J 7/34* | (2006.01) |
| *H01R 13/703* | (2006.01) |

(52) U.S. Cl.
CPC ......... *H01M 50/20* (2021.01); *H01M 50/502* (2021.01); *H02J 7/007* (2013.01); *H02J 7/0036* (2013.01); *H02J 7/0045* (2013.01); *H02J 7/0047* (2013.01); *H02J 7/0068* (2013.01); *H02J 9/00* (2013.01); *H01M 2220/10* (2013.01); *H01R 13/7031* (2013.01); *H02J 7/345* (2013.01)

(56) References Cited

U.S. PATENT DOCUMENTS

| | | | |
|---|---|---|---|
| 8,937,406 B2 | 1/2015 | Wang | 19/6 |
| 9,748,799 B2 | 8/2017 | Nandam | H02J 9/061 |
| 9,893,562 B2 | 2/2018 | Lee | H02J 9/061 |
| 10,153,658 B2 * | 12/2018 | Nandam | H01M 50/20 |
| 10,714,971 B2 * | 7/2020 | Nandam | H01M 50/20 |
| 2010/0244567 A1 | 9/2010 | Brookshire | H01M 10/48 |
| | | | 307/66 |

OTHER PUBLICATIONS

Notification Concerning Transmittal of International Preliminary Report on Patentability, International Patent Application No. PCT/US2016/013990, dated Jul. 25, 2017, 8 pages.

\* cited by examiner

BATTERY MODULES HAVING DETECTION CONNECTORS AND RELATED SYSTEMS

CROSS REFERENCE TO RELATED APPLICATIONS

This application is a continuation of U.S. application Ser. No. 16/213,211, filed Dec. 7, 2018, now U.S. Pat. No. 10,714,971, issued Jul. 14, 2020, which is a continuation of U.S. application Ser. No. 14/601,364, filed Dec. 11, 2018, now U.S. Pat. No. 10,153,658, issued Dec. 11, 2018, the contents of which are hereby incorporated herein by reference in their entireties.

FIELD

The inventive concept relates generally to uninterruptible power supplies (UPSs) and, more particularly, to detection of batteries associated with UPSs.

BACKGROUND

Uninterruptible power supply (UPS) systems are commonly used in installations such as data centers, medical centers and industrial facilities. UPS systems may be used in such installations to provide backup power to maintain operation of computer, medical devices and other critical equipment in event of failure of a primary utility supply. These UPS systems commonly have an "on-line" configuration including a rectifier and inverter coupled by a DC link that is also coupled to a backup power source, such as a battery. Other UPS configurations may also be used, such as standby and line-interactive configurations.

In most UPSs, the battery modules are one of the most important components. For this reason, they typically require regular and periodic maintenance/inspection. In order to facilitate this for the customers or for service technicians, battery modules in UPSs are typically designed to be easily replaceable. This can be accomplished by, for example, using blind-mate connectors, or with front disconnect cables. However, when a battery module is installed/inserted into and/or pulled out of a UPS Chassis, the firmware in the UPS needs to be able to detect that the battery module has been installed and/or pulled out. Improved methods for detection of battery installation, replacement and/or removal are desired.

SUMMARY

Some embodiments of the inventive concept provide a battery module including a battery module connector configured to engage with a backplane connector on a backplane board associated with an uninterruptible power supply (UPS). When the battery module connector is engaged with the backplane connector a circuit is completed that instantaneously indicates to the UPS that the battery module is connected. When the battery module connector is disengaged from the backplane connector the circuit is opened and instantaneously indicates to the UPS that the battery module is disconnected.

In further embodiments, when the battery module connector is engaged with the backplane connector a center point voltage may be detected.

In still further embodiments, an alarm may be triggered responsive to the indication that the battery module has been disconnected.

In some embodiments, the UPS may include at least one battery string.

In further embodiments, the battery module connector may include a female connector having two signal contacts that are shorted together. The backplane connector may be a male connector configured to receive the battery module connector. The battery module connector may be removed from the backplane connector and the backplane connector becomes an open circuit.

In still further embodiments, the battery module may be positioned in an external battery module (EBM) in communication with the UPS.

In some embodiments, the battery module may not include a bleed resistor.

In further embodiments, the battery module may be associated with a battery charger and the battery charger may not be periodically turned off to allow a capacitor connected in parallel to the battery module to discharge.

Still further embodiments of the present inventive concept provide a backplane board associated with an uninterruptible power supply (UPS) including a backplane connector that is configured to engage a battery module connector. When the battery module connector is engaged with the backplane connector a circuit is completed that indicates to the UPS that the battery module is connected. When the battery module connector is disengaged from the backplane connector the circuit is opened and instantaneously indicates to the UPS that the battery module is disconnected.

Some embodiments of the present inventive concept provide a system including an uninterruptible power supply (UPS) and at least one battery module. The at least one battery module includes a battery module connector configured to engage with a backplane connector on a backplane board associated with the uninterruptible power supply (UPS). When the battery module connector is engaged with the backplane connector a circuit is completed that instantaneously indicates to the UPS that the at least one battery module is connected. When the battery module connector is disengaged from the backplane connector the circuit is opened and instantaneously indicates to the UPS that the at least one battery module is disconnected.

DETAILED DESCRIPTION

Specific example embodiments of the inventive concept now will be described with reference to the accompanying drawings. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As discussed above, when a battery module is pulled out of a UPS Chassis, the firmware (software) in the UPS needs to be able to detect that the battery module has been pulled out. Detection of battery removal is not an easy task because there is typically a capacitor in the UPS that is parallel to the battery, to reduce the battery current ripple. The capacitor has a voltage that is equal to the battery voltage. Therefore, the circuitry that measures the battery voltage and feeds that information back to the micro-controller or digital signal processor (DSP) in the UPS still keeps measuring the battery voltage across the capacitor even after the battery module is pulled out. This is especially true when a battery charger is still operating and maintains a constant charge voltage. This problem is exacerbated when dealing with parallel connected strings of batteries or in modular UPSs, where there are more than one set of battery strings connected to a common direct current (DC) Bus. In these embodiments, even when one battery module is pulled out, the battery bus voltage is still unchanged as many other strings are connected to the same DC Bus. Consequently, the firmware in the UPS cannot detect that the battery module was removed or was disconnected. The customer cannot be notified, for example, with an alarm, that the battery module has been removed if the system is unable to detect that the battery module has been removed. Similarly, if a battery is installed, the UPS is unable to detect the installation of a battery or replacement thereof.

The inability to detect connection/disconnection of battery modules could cause major issues for the customer if, for example, the input alternating current (AC) power were to fail. In this scenario, the UPS would still try to transfer to battery and, because the battery has been removed, the UPS will drop the load if this occurs in a single battery module UPS. No alarm may be logged that may help in tracing and troubleshooting the cause for the load drop. Even if the input AC power does not fail, but the customer removes or replaces one or more battery module(s) in a multi-module UPS, the UPS firmware will not be able to detect the disconnection or reconnection of the battery modules. Thus, the battery remaining time (BTR) estimate will be incorrect. This may result in the software that monitors the UPS to incorrectly shut down the load either too early, or delay it so much that the load may get dropped unintentionally.

The larger the battery capacitor value of the capacitor in parallel with the battery, the worse is the problem of being able to detect battery disconnection or reconnection. Currently, there are two methods used to address this problem in a non-modular UPS. The first method is to connect a bleed resistor across the battery capacitor. This bleed resistor is typically from about 2 to about 6 MΩ. When the battery module is disconnected, this bleed resistor discharges the battery capacitor, and the firmware of the UPS can detect the drop in voltage across the capacitor and issue an alarm that the battery has been disconnected. The problem with this solution is that as long as the battery charger is still on, the battery capacitor will still be charged and the bleed resistor cannot discharge the battery capacitor. To address this issue, a higher bleed resistor can be used, but this will result in unnecessarily discharging the battery when it is connected, thus, reducing the battery life (leakage >100 uA is detrimental to battery life). Using a lower bleed resistor leads to a longer time before detecting that the battery has been disconnected.

For modular UPSs, with multiple battery strings connected to a common DC bus, some products have used complicated monitoring circuits of individual battery modules or used some sort of battery center point detection using capacitive networks.

The second method to detect disconnected battery modules is to turn the battery charger off for a short time, for example, from about 5 to about 50 milliseconds, every 30 seconds, and hopefully detect a drop in the battery capacitor voltage during that short time and issue an alarm that the battery has been disconnected. Using this method, it may take a long time to detect disconnected batteries, especially in parallel connected strings in a modular UPS. Furthermore, this method may result in false alarms, as the firmware would now have to depend on the rate of change of the voltage, and also differentiate it from other battery related alarms, such as the service alarm, and the under voltage alarm. This method may also interrupt the charging cycle and may affect the recharge time of the battery. Accordingly, some embodiments of the present inventive concept provide improved methods and systems for detecting the connection and/or disconnection of a battery module in single and modular UPSs.

In particular, some embodiments of the present inventive concept provide the instantaneous detection of disconnected battery modules and reconnected battery modules to the UPS. Embodiments of the present inventive concept can provide detection of disconnected batteries without adding any bleed resistors across the batteries, and without interrupting the battery charger. Furthermore, embodiments of the present inventive concept are also independent of the size of the battery capacitor used across the batteries, and the number of battery strings connected to the common DC bus. Thus, embodiments of the present inventive concept may extend battery life by not having any bleed resistors across the capacitor; not limiting the size of the battery capacitor thus reducing the battery ripple current which in turn extends battery life; not having to intermittently turn the battery charger off and on, thus, not affecting the recharge time of a battery; issuing an alarm/notification instantaneously to the customer as soon as the batteries are disconnected and/or reconnected; and can be used in single and modular UPSs and external battery modules (EBM) that communicate with the UPSs without departing from the scope of the present inventive concept. Embodiments of the present inventive concept provide the instantaneous detection of a status of the battery by providing a series of pins in the battery module connector that when connected/disconnected cause a change in a voltage, which is communicated to the UPS and may cause an alert to be issued as will be discussed further below with respect to FIGS. 1 through 7.

Figure 1:
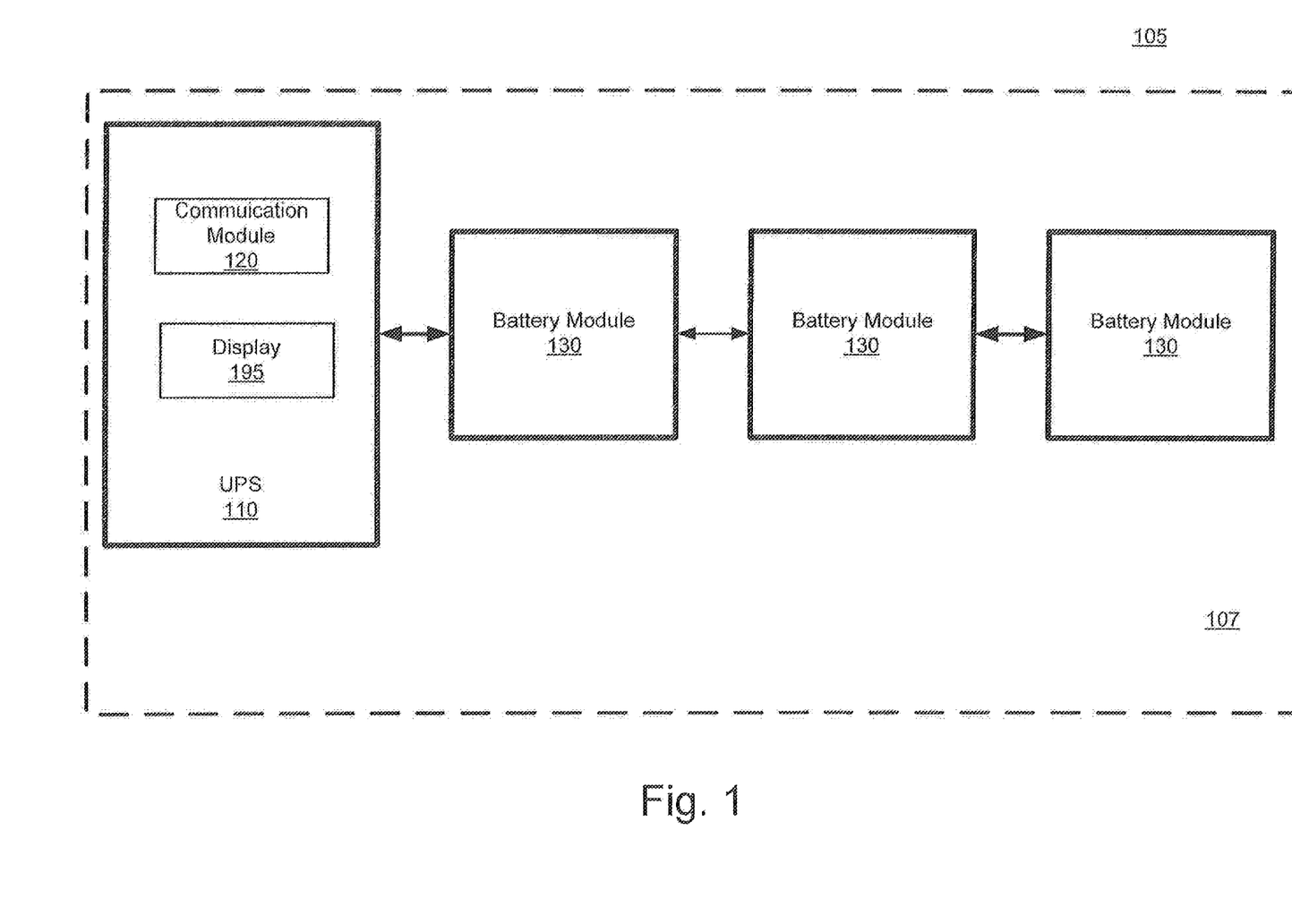
FIG. 1 is a block diagram of a system including an uninterruptible power supply (UPS) and a plurality of battery modules in accordance with some embodiments of the present inventive concept.

Referring now to FIG. 1, a system in accordance with some embodiment of the present inventive concept will be discussed. As illustrated in FIG. 1, the system may include a UPS 110 and a plurality of battery modules 130. In some embodiments, the battery modules 130 may be multiple parallel strings of batteries connected to a common DC Bus. As will be discussed further below, UPSs according to embodiments discussed herein may be UPSs having a single string battery, a multi-string battery and/or a multi-module multi-string battery without departing from the scope of the present inventive concept. The battery modules 130 may be installed in the UPS chassis or may be separate therefrom. For example, in some embodiments, the batteries may be provided by external battery modules (EBMs). The EBMs may have their own chassis.

As further illustrated in FIG. 1, the UPS 110 includes a communication module 120 and a display 195. The communication module 120 of the UPS is configured to receive information (voltages) from the battery modules 130 and provide an alarm and/or visual indication on the display 195 that a battery module 130 has been removed.

Figure 2:
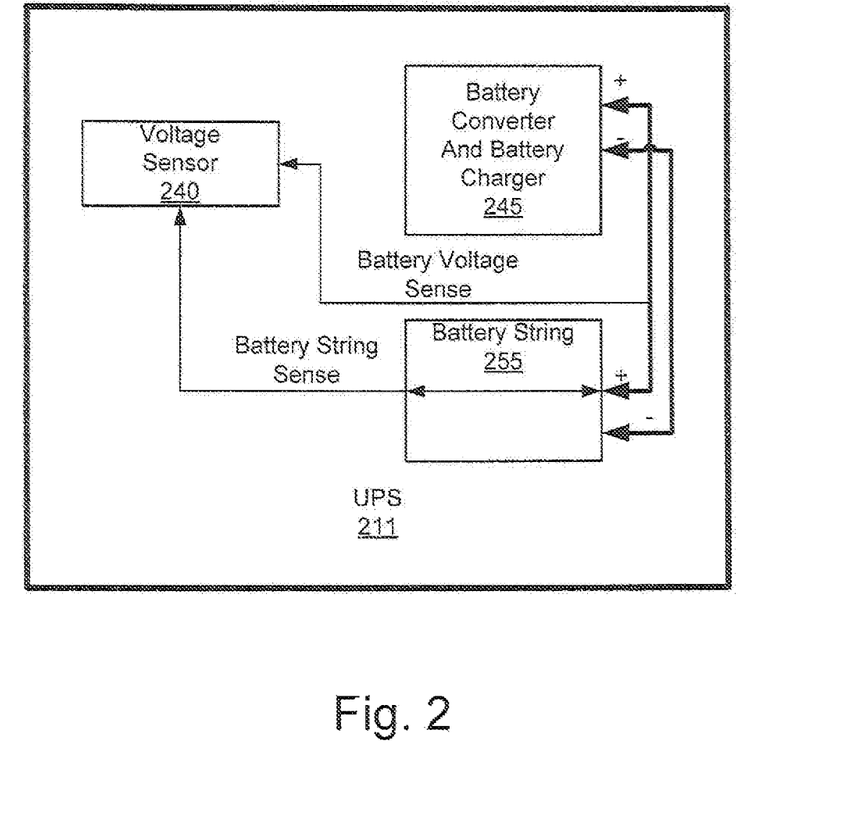
FIG. 2 is a block diagram of a UPS having a single string battery in accordance with some embodiments of the present inventive concept.
Figure 3:
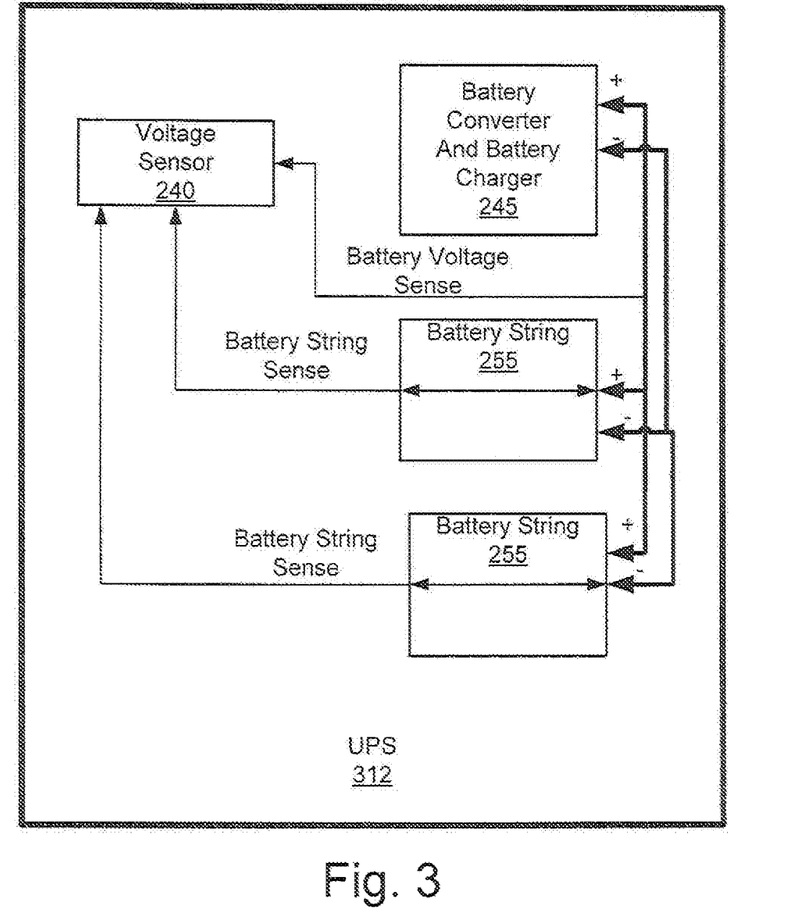
FIG. 3 is a block diagram of a UPS having a multi-string battery in accordance with some embodiments of the present inventive concept.
Figure 4:
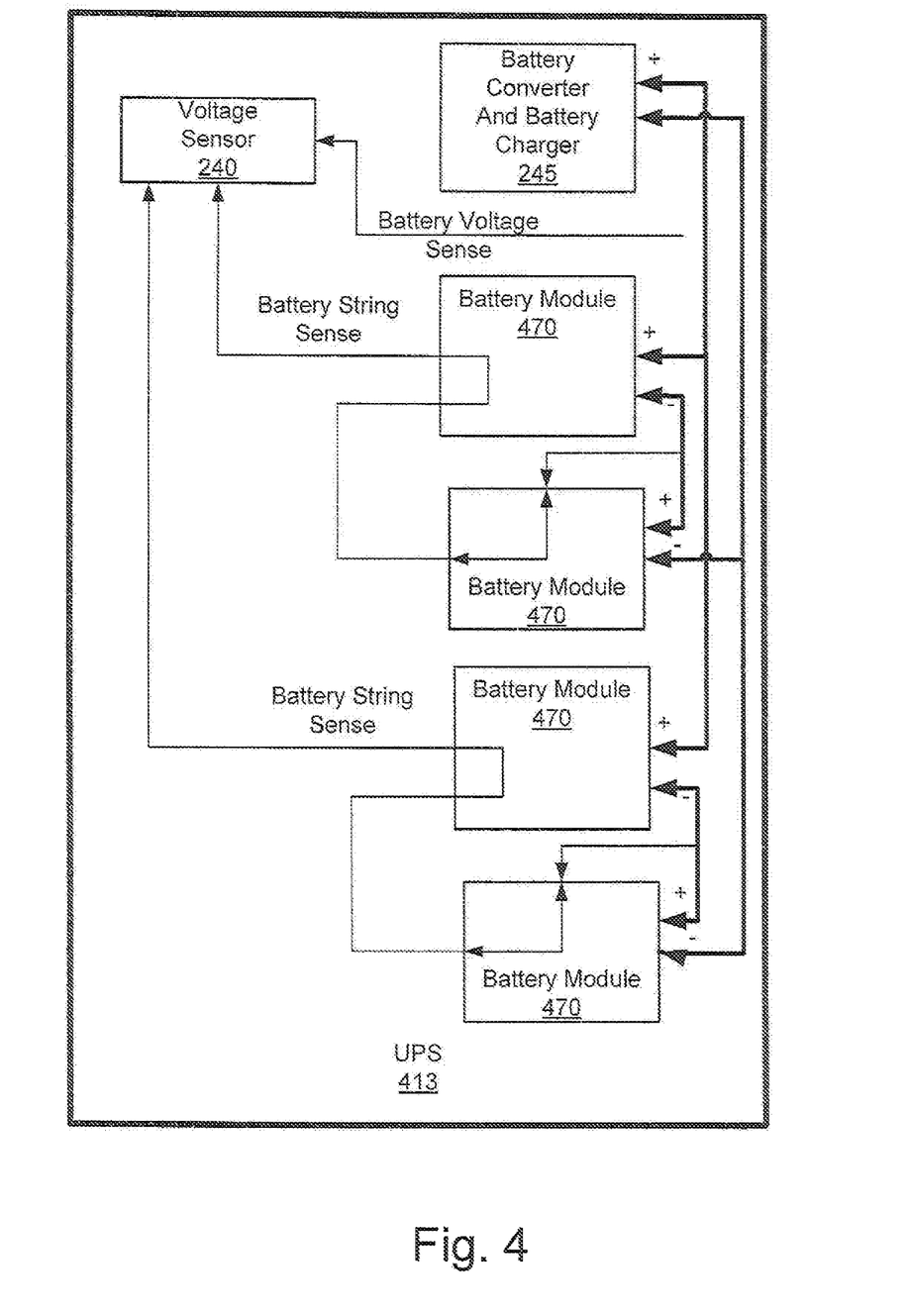
FIG. 4 is a block diagram of a UPS having a multi-module multi-string battery in accordance with some embodiments of the present inventive concept.

Referring now to FIGS. 2-4, various embodiments of UPSs in accordance with some embodiments of the present inventive concept will be discussed. Referring first to FIG. 2, a UPS having a single string battery will be discussed. As illustrated in FIG. 2, the UPS 211 includes a voltage sensor 240, a battery converter and a battery charger 245 and a battery string 255. As illustrated, a battery sense voltage and battery string sense are provided to the voltage sensor 240. When a battery is connected/removed the voltage sensor 240 will detect a change in voltage, for example, a center point voltage, using the battery string sense and/or the battery voltage sense. The voltage change detected may be sensed using connectors on the battery module and the backplane. The connector in accordance with some embodiments of the present inventive concept includes the battery power pins to connect to the UPS, and two additional signal pins. The circuit (voltage sensor 240) in the UPS senses the signal pins, and will immediately detect the disconnection or re-connection of the battery module.

Figure 5:
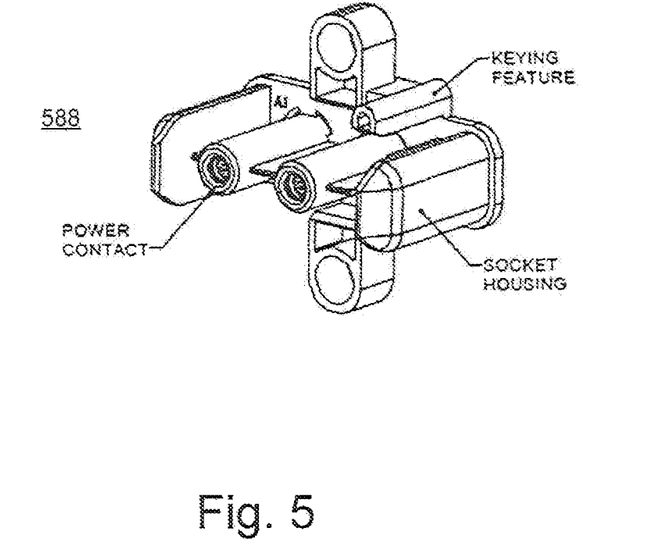
FIG. 5 is a diagram of a connector for use on a battery module in accordance with some embodiments of the present inventive concept.
Figure 6:
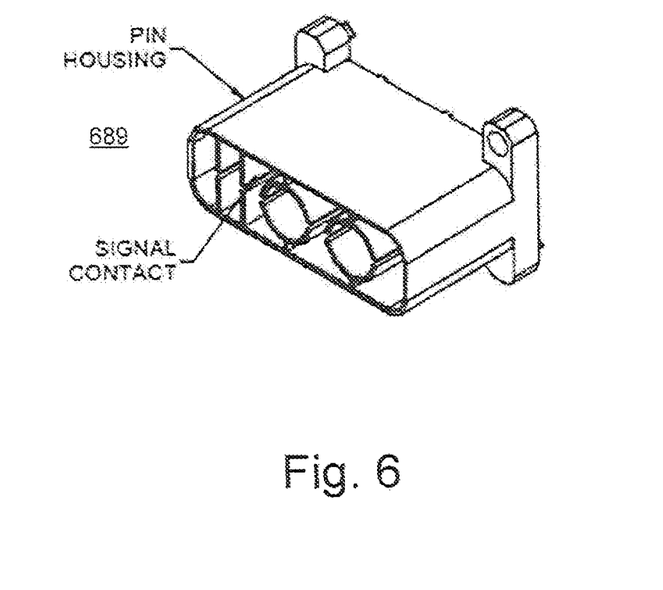
FIG. 6 is a diagram of the connector for use on a backplane of the UPS in accordance with some embodiments of the present inventive concept.

In particular, as illustrated in FIG. 5, a connector used in the battery module may include additional signal pins 588 in addition to the power pins on the connector for the battery module. As illustrated in FIG. 5, the pins 588 are male pins and are configured to be received by a female connector 689 on the backplane board (FIG. 6 discussed below). The connector may be a DC connector and the two signal pins 588 are shorted together. The other half of the connector on the backplane board 689 is illustrated in FIG. 6. When the battery module is pulled out, the two signal pins 689 on the backplane board become open circuited thus breaking the path for the circuit on the backplane board that senses the mid-point voltage. This change in voltage is communicated to the UPS, which is used to trigger an alert. Thus, an additional voltage sense signal (FIG. 2) is provided responsive to the engagement/disengagement of the additional signal pins 588/689 on the connectors.

In some embodiments of the present inventive concept, the female connector may be used on the module side and the male connector may be used on the backplane side. These embodiments help reduce the likelihood, or possibly prevent, customers from touching live pins on the battery module when it is pulled out of the chassis. However, it will be understood that embodiments of the present inventive concept are not limited to this configuration. The female and/or male connectors can be on the module and/or the backplane without departing from the scope of the present inventive concept.

Referring now to FIG. 3, a UPS 312 having multiple battery strings 255 will be discussed. Operations of the UPS 312 are similar to those discussed above with respect to FIG. 2, but more than one connector will be sensed by the voltage sensor 240. Thus, no matter which battery is removed from any string, an alarm can be triggered. Similarly, when a battery is installed/connected, it is recognized and the number of batteries reported to the UPS may change such that BTR can be accurately estimated.

Referring now to FIG. 4, a UPS 413 having multiple modules and multiple strings 470 will be discussed. Again, operations of the UPS 413 are similar to those discussed above with respect to FIG. 2, but more than one connector will be sensed by the voltage sensor 240. Thus, no matter which battery is removed from any string or module, an alarm can be triggered. Thus, according to some embodiments of the present inventive concept, in a modular UPS with multiple strings of battery modules connected to a common DC bus, embodiments of the present inventive concept can instantaneously detect a center point voltage of the battery string without using any complicated capacitive circuits.

For example, in a modular UPS design in accordance with some embodiments, in order to reduce the weight of the battery module, a string of ten batteries is split into two battery modules with five batteries per each module, with each module's connector having two signal pins (FIG. 5). The power pins of the two battery modules are connected in series on the backplane PCB to form a string of 10 batteries (120 Volts). The signal pins on the backplane board are connected in such a way so that the center point of the battery string voltage can be detected (FIGS. 5 and 6 above). However, in order to complete this center point voltage detection circuit, the battery modules need to be installed and connected to the backplane board. Thus, as discussed above, in accordance with some embodiments, on the battery module side, the signal pins are shorted together (FIG. 5), and only when the battery module is fully connected to the backplane PCB (FIG. 6) and to the UPS, would the center point voltage be detected by the UPS hardware and firmware. Thus, when the female connector of FIG. 5 is fully engaged with the male connector of FIG. 6 the center point voltage can be detected. Once the battery module is no longer connected, the UPS may trigger an alarm indicating that the battery has been disconnected.

In accordance with some embodiments, as soon as a battery module is pulled out for maintenance or replacement, the UPS hardware and firmware will immediately detect this because the signal pins on the UPS side on the backplane PCB would lose their connection that was provided by the battery module side of the signal pins. Conversely, as soon as a battery module is connected, or installed, the UPS would immediately detect it. Thus, embodiments of the present inventive concept provide methods and systems for detection of connection/disconnection of battery modules that address the problems with conventional methods discussed above and are especially useful in modular UPSs with parallel battery strings connected to a common DC bus.

Figure 7:
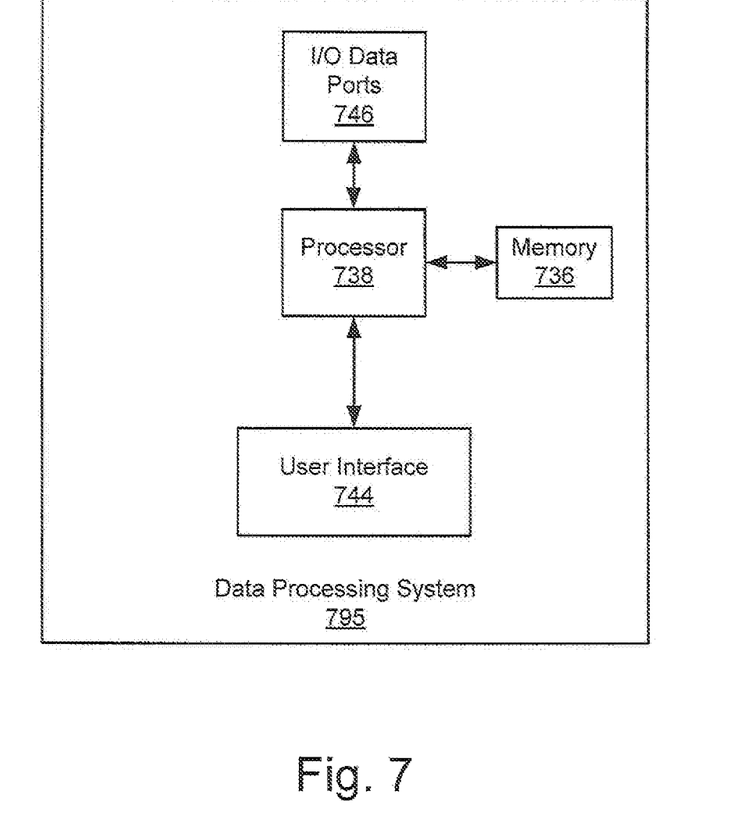
FIG. 7 is a block diagram illustrating a data processor that can be used in accordance with various embodiments of the present inventive concept.

Referring now to FIG. 7, a block diagram of a data processing system 795 that may be included in one or more of the communications module 120 and/or the UPSs in accordance with some embodiments will be discussed. As illustrated in FIG. 7, the data processing system 795 may include a user interface 744, including, for example, input device(s) such as a man machine interface (MMI) including, but not limited to a keyboard or keypad and a touch screen; a display; a speaker and/or microphone; and a memory 736 that communicate with a processor 738. The data processing system 795 may further include I/O data port(s) 746 that also communicates with the processor 738. The I/O data ports 746 can be used to transfer information between the data processing system 795 and another computer system or a network, such as an Internet server, using, for example, an Internet Protocol (IP) connection. These components may be conventional components such as those used in many conventional data processing systems, which may be configured to operate as described herein.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed example embodiments of the inventive concept. Although specific terms are employed, they are used in a generic and descriptive sense only and not for purposes of limitation, the scope of the inventive concept being defined by the following claims.

That which is claimed:

1. A battery module comprising a battery module connector configured to engage with a backplane connector on a backplane board,
wherein a voltage sensor is configured to detect a change in voltage when the battery module connector is engaged with the backplane connector and a circuit is completed that instantaneously indicates that the battery module is connected and when the battery module connector is disengaged from the backplane connector and the circuit is opened and instantaneously indicates that the battery module is disconnected;
wherein the battery module includes a plurality of batteries connected series; and
wherein when the battery module connector is engaged with the backplane connector a center point voltage of a string of batteries is detected by the voltage sensor.

2. The battery module of claim 1, wherein the battery module is included in a system including a plurality of battery modules connected in series when positioned in a single slot of a chassis and wherein each of the battery modules comprises a battery module connector configured to engage in the backplane connector on the backplane board.

3. The battery module of claim 2:
wherein the plurality of battery modules is a first plurality of battery modules and wherein the chassis is a first chassis;
wherein each of the first plurality of battery modules include a plurality of batteries therein connected in series and wherein the first plurality of battery modules positioned in the single slot of the chassis are connected in series such that the batteries in the first plurality of battery modules provide a string of the plurality of batteries;
wherein a second plurality of battery modules are provided in a second chassis, different from the first chassis, the second plurality of battery modules in the second chassis being connected in parallel to the first plurality of battery modules in the first and second chasses; and
wherein both the first plurality of battery modules and the second plurality of battery modules are coupled to the backplane board using a first backplane connector and a second backplane connector, respectively.

4. The battery module of claim 1, wherein an alarm is triggered responsive to an indication that the battery module has been disconnected.

5. The battery module of claim 1, wherein the battery module connector comprises a male connector having two signal contacts that are shorted together or a female connector configured to receive the male connector.

6. The battery module of claim 5, wherein the backplane connector is a female connector configured to receive the battery module connector or a female connector configured to receive the male connector.

7. The battery module of claim 6, wherein when the battery module connector is removed from the backplane connector, the backplane connector becomes an open circuit.

8. The battery module of claim 1, wherein the battery module is positioned in an external battery module (EBM) in communication with an uninterruptible power supply (UPS).

9. The battery module of claim 1, wherein the battery module does not include a bleed resistor.

10. The battery module of claim 1, wherein the battery module is associated with a battery charger and wherein the battery charger is not periodically turned off to allow a capacitor in parallel with the battery module to discharge.

11. A backplane board comprising a backplane connector that is configured to engage a battery module connector,
wherein a voltage sensor is configured to detect a change in voltage when the battery module connector is engaged with the backplane connector and a circuit is completed that instantaneously indicates that a battery module is connected and when the battery module connector is disengaged from the backplane connector and the circuit is opened and instantaneously indicates that the battery module is disconnected;
wherein the battery module includes a plurality of batteries connected series; and
wherein when the battery module connector is engaged with the backplane connector a center point voltage of a string of batteries is detected by the voltage sensor.

12. The backplane board of claim 11, wherein the battery module includes a plurality of battery modules connected in series when positioned in a single slot of a chassis and wherein each of the battery modules comprises a battery module connector configured to engage in the backplane connector on the backplane board associated.

13. The backplane board of claim 12:
wherein the plurality of battery modules is a first plurality of battery modules and wherein the chassis is a first chassis;
wherein each of the first plurality of battery modules include a plurality of batteries therein connected in series and wherein the first plurality of battery modules positioned in the single slot of the chassis are connected in series such that the batteries in the first plurality of battery modules provide a string of the plurality of batteries;
wherein a second plurality of battery modules are provided in a second chassis, different from the first chassis, the second plurality of battery modules in the second chassis being connected in parallel to the first plurality of battery modules in the first and second chasses; and
wherein both the first plurality of battery modules and the second plurality of battery modules are coupled to the backplane board using a backplane connector.

14. A system comprising:
a plurality of battery modules connected in parallel, each of the plurality of battery modules comprising:
a battery module connector configured to engage with a backplane connector on a backplane board; and
a voltage sensor configured to detect a change in voltage when the battery module connector is engaged with the backplane connector and a circuit is completed that instantaneously indicates that the battery module is connected and when the battery module connector is disengaged from the backplane connector and the circuit is opened and instantaneously indicates that the battery module is disconnected;
wherein the battery module includes a plurality of batteries connected series; and
wherein when the battery module connector is engaged with the backplane connector a center point voltage of a string of batteries is detected by the voltage sensor.

15. The system of claim 14:
wherein the battery module is included in a system including a plurality of battery modules connected in series when positioned in a single slot of a chassis and wherein each of the battery modules comprises a battery module connector configured to engage in the backplane connector on the backplane board.

16. The system of claim 15:

wherein the plurality of battery modules is a first plurality of battery modules and wherein the chassis is a first chassis;

wherein each of the first plurality of battery modules include a plurality of batteries therein connected in series and wherein the first plurality of battery modules positioned in the single slot of the chassis are connected in series such that the batteries in the first plurality of battery modules provide a string of the plurality of batteries;

wherein a second plurality of battery modules are provided in a second chassis, different from the first chassis, the second plurality of battery modules in the second chassis being connected in parallel to the first plurality of battery modules in the first and second chasses; and wherein both the first plurality of battery modules and the second plurality of battery modules are coupled to the backplane board using a first backplane connector and second backplane connector, respectively.

17. The system of claim 14, wherein, responsive to an indication that one of the plurality of battery modules has been disconnected, a number of batteries reported is changed and a battery time remaining (BTR) estimate is updated responsive thereto.

18. The system of claim 14, wherein the battery module connector comprises a male connector having two signal contacts that are shorted together.

19. The system of claim 14, wherein the backplane connector is a female connector configured to receive the battery module connector.

20. The system of claim 14, wherein when the battery module connector is removed from the backplane connector, the backplane connector becomes an open circuit.

* * * * *

UNITED STATES PATENT AND TRADEMARK OFFICE
CERTIFICATE OF CORRECTION

Page 1 of 1

PATENT NO. : 11,063,471 B2
APPLICATION NO. : 16/927504
DATED : July 13, 2021
INVENTOR(S) : Nandam et al.

It is certified that error appears in the above-identified patent and that said Letters Patent is hereby corrected as shown below:

In the Specification

Column 1, Line 10: Please correct "Ser. No. 14/601,364, filed Dec. 11, 2018" to read -- Ser. No. 14/601,364, filed Jan. 21, 2015 --

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*